(12) United States Patent
Koike et al.

(10) Patent No.: US 7,416,403 B2
(45) Date of Patent: Aug. 26, 2008

(54) DIE CLAMPING UNIT

(75) Inventors: Jun Koike, Sunto-gun (JP); Takaki Miyauchi, Numazu (JP); Makoto Nishizawa, Numazu (JP); Nobuyuki Muroi, Mishima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 212 days.

(21) Appl. No.: 11/401,460

(22) Filed: Apr. 11, 2006

(65) Prior Publication Data

US 2006/0246172 A1  Nov. 2, 2006

(30) Foreign Application Priority Data

Apr. 13, 2005  (JP) .............................. 2005-115920

(51) Int. Cl.
*B29C 45/64* (2006.01)
(52) U.S. Cl. .................... 425/589; 425/441; 425/450.1; 425/595
(58) Field of Classification Search ................. 425/150, 425/589, 595, 441, 450.1
See application file for complete search history.

(56) References Cited

U.S. PATENT DOCUMENTS 6,877,977 B2   4/2005   Wohlrab

2003/0189267 A1 *  10/2003  Nishizawa et al. .......... 425/595

FOREIGN PATENT DOCUMENTS

| DE | 102 02 374 | 7/2003 |
| JP | 10-296739 | * 11/1998 |
| JP | 2004-98582 | 4/2004 |
| JP | 2004-314491 | * 11/2004 |
| JP | 2004-314492 | 11/2004 |

* cited by examiner

*Primary Examiner*—James Mackey
(74) *Attorney, Agent, or Firm*—DLA Piper US LLP (57) ABSTRACT

A die clamping unit includes a stationary platen, a tie bar which is attached to the stationary platen, a movable platen which is movable forwards and backwards along the tie bar with respect to the stationary platen, a first servomotor which moves the movable platen away from the stationary platen in a core-back operation, a second servomotor which moves the movable platen forwards and backwards to perform die-opening and -closing, and a control device which drives the first servomotor to move the movable platen away from the stationary platen and which drives the second servomotor to apply a force to the movable platen in the direction toward the stationary platen in the core-back operation.

8 Claims, 5 Drawing Sheets

DIE CLAMPING UNIT

CROSS-REFERENCE TO RELATED APPLICATIONS

This application is based upon and claims the benefit of priority from prior Japanese Patent Application No. 2005-115920, filed Apr. 13, 2005, the entire contents of which are incorporated herein by reference.

BACKGROUND OF THE INVENTION

1. Field of the Invention

Embodiments of the present invention relate to a die clamping unit for dies, more particularly to a die clamping unit which performs a core-back operation in an injection molding process.

2. Description of the Related Art

A core-back operation is performed in a molding process in a case where a material mixed with a foaming agent is used, for example, in an injection molding machine or the like. The core-back refers to an operation in which a movable platen provided with a movable die is moved backward at a low speed wherein large part of a material is molten. Here, to move backward the movable platen indicates the moving of the movable platen in a direction away from a stationary platen. According to this core-back operation, a pressure in dies is lowered, and foaming of the foaming agent is promoted. A die clamping unit which performs this type of core-back is described in for example, Jpn. Pat. Appln. KOKAI Publication No. 2004-314492.

In the core-back operation, the movable platen is moved by, for example, a servomotor. In the core-back operation, an inertial force develops on the movable platen with the movement of the movable planten. Therefore, even if the drive of the servomotor is stopped at completion of the core-back, the movable platen often continues to move under its own inertia.

During the core-back, a back pressure is applied to a die clamping unit via a hydraulic die clamping cylinder. The back pressure is a pressure that generates a force in a direction opposite to a moving direction of the movable platen.

BRIEF SUMMARY OF THE INVENTION

According to one embodiment of the present invention, a die clamping unit includes: a stationary platen; a tie bar which is attached to the stationary platen; a movable platen which is movable forwards and backwards along the tie bar with respect to the stationary platen; a first servomotor which moves the movable platen away from the stationary platen in a core-back operation; a second servomotor which moves the movable platen forwards and backwards to perform die-opening and -closing; and a control device. The control device drives the first servomotor to move the movable platen away from the stationary platen and which drives the second servomotor to apply a force to the movable platen in the direction toward the stationary platen in the core-back operation.

Here, the core-back operation is an operation of moving the movable platen provided with a movable die away from the stationary platen at a low speed wherein a large part of a material is molten, to promote foaming of a foaming material.

Additional aspects of embodiments of the invention will be set forth in the description which follows, and in part will be obvious from the description, or may be learned by practice of the invention. The aspects of embodiments of the invention may be realized and obtained using instrumentation and combinations particularly pointed out hereinafter.

BRIEF DESCRIPTION OF THE DRAWINGS

The accompanying drawings, which are incorporated herein and constitute a part of the specification, illustrate embodiments of the invention, and together with the general description given above and the detailed description of the embodiments given below, serve to explain the principles of embodiments of the invention.

DETAILED DESCRIPTION OF SEVERAL EMBODIMENTS OF THE INVENTION

There will be described hereinafter an embodiment of the present invention applied to a die clamping unit of an injection molding machine, for example.

Figure 1:
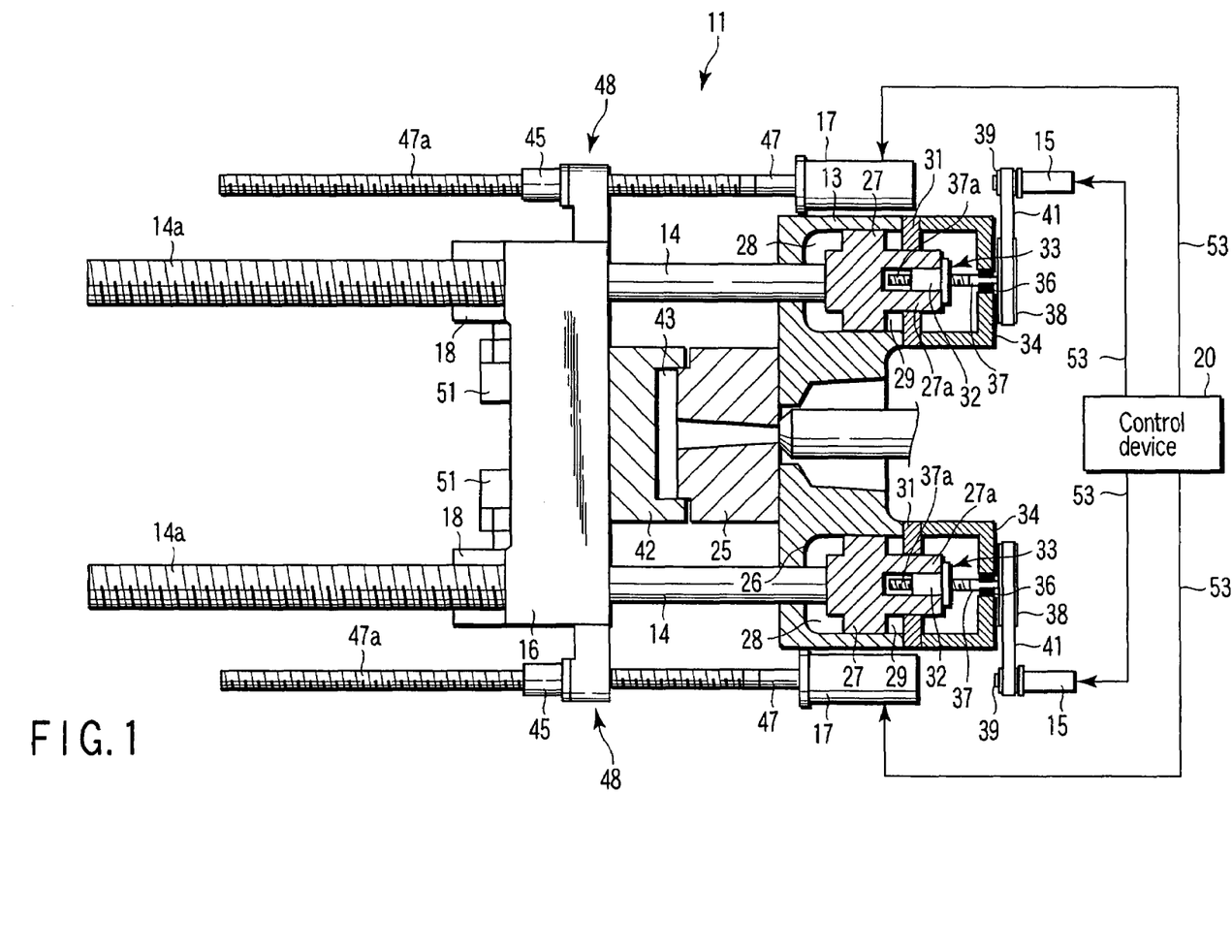
FIG. 1 is a plan view showing a section of a part of a die clamping unit according to a first embodiment of the present invention.

FIG. 1 shows a die clamping unit 11 according to a first embodiment of the present invention. As shown in FIG. 1, the die clamping unit 11 includes a stationary platen 13, tie bars 14, tie bar sliding servomotors 15, a movable platen 16, die opening/closing servomotors 17, halfnuts 18, and a control device 20. The tie bar sliding servomotors 15 is an example of a first servomotor. The die opening/closing servomotor 17 is an example of a second servomotor. The halfnut 18 is an example of a fixing mechanism.

A stationary die 25 is attached to a front face of the stationary platen 13. A hydraulic die clamping cylinder 26 is provided in the stationary platen 13. The plurality of tie bars 14 are attached to the stationary platen 13 to be movable forwards and backwards. Specifically, each of the tie bar 14 includes piston portion 27 on its proximal end. The piston portions 27 are disposed in the hydraulic die clamping cylinder 26. Accordingly, in the hydraulic die clamping cylinder 26, each piston portion 27 is sandwiched between two cylinder chambers including a die-clamping-side chamber 28 and a die-opening-side chamber 29.

When a hydraulic fluid is supplied to each die-clamping-side chamber 28, each tie bar 14 moves backwards. The backward movement of the tie bar 14 indicates that the tie bar 14 moves to the right in FIG. 1. When the hydraulic fluid is supplied to the die-opening-side chamber 29, the tie bar 14 moves forwards. An outer peripheral face of the tie bar 14 is provided with an engaging groove 14a including a saw-tooth and a threaded or annular groove.

Partition walls 31 are attached to a back face of the stationary platen 13. A proximal end 27a of each piston portion 27 extends through the partition wall 31 to protrude from the wall 31. A nut portion 32 is attached to an axial center portion of the piston portion 27 extending through the partition wall 31. The nut portion 32 constitutes a part of a ball screw 33. The ball screw 33 is one example of a feed screw.

In each partition wall 31, a positioning box 34 is attached to a face of the partition wall opposite to a face of the wall to which the hydraulic die clamping cylinder 26 is attached. A bearing 36 is attached to the back face of the positioning box 34 coaxially with the piston portion 27. The back face of the positioning box 34 is the face opposite to the face attached to the partition wall 31. A threaded shaft 37 of the ball screw 33 is rotatably supported by the bearing 36.

A distal end of each threaded shaft 37 is provided with a screw portion 37a. This screw portion 37a is in threaded engagement with the nut portion 32. A proximal end of the threaded shaft 37 extends through the back face of the positioning box 34. This protruding portion is provided with a driven pulley 38.

Each tie bar sliding servomotor 15 is attached to an outer portion of the positioning box 34. In this embodiment, the tie bar sliding servomotor 15 functions as an engaged-position adjusting servomotor. The tie bar sliding servomotor 15 is provided with a driving pulley 39. A timing belt 41 is extended between the driving pulley 39 and the driven pulley 38.

Therefore, when each tie bar sliding servomotor 15 is driven, the threaded shaft 37 of the ball screw 33 rotates. A rotary movement of the threaded shaft 37 is transformed into a linear movement of the piston portion 27 via the nut portion 32. That is, when the tie bar sliding servomotor 15 is driven, the tie bar 14 can be moved forwards and backwards.

The movable platen 16 is displaced via the tie bars 14. The movable platen 16 is movable along the tie bars 14 in a forward and a backward direction such that the movable platen 16 moves close to or away from the stationary platen 13.

A movable die 42 is provided on a front face of the movable platen 16. The front face of the movable platen 16 faces the stationary platen 13. The movable die 42 is attached facing the stationary die 25. A die face of the stationary die 25 comes in contact with a die face of the movable die 42 to thereby form a cavity 43 between the stationary die 25 and the movable die 42.

Moreover, nut portions 45 are fixed to side faces of the movable platen 16. The die opening/closing servomotors 17 are attached to the stationary platen 13 via brackets (not shown). A threaded shaft 47 is attached to a rotary shaft of each die opening/closing servomotor 17. Each threaded shaft 47 has a screw portion 47a. Each screw portion 47a is in threaded engagement with the nut portion 45. The threaded shaft 47 and the nut portions 45 constitute each ball screw 48. The ball screw 48 is one example of a feed screw.

Therefore, when the die opening/closing servomotors 17 are driven, the threaded shafts 47 rotate. A rotary movement of each threaded shaft 47 is transformed into a linear movement of the movable platen 16 via the nut portions 45. That is, when the die opening/closing servomotors 17 are driven, the movable platen 16 can be moved forwards and backwards. Accordingly, the movable die 42 opens and closes with respect to the stationary die 25.

The halfnuts 18 are attached to the back face of the movable platen 16. The halfnuts 18 releasably engage with the engaging grooves 14a of the tie bars 14. The halfnuts 18 are driven in a radial direction of the tie bar 14 by an opening/closing cylinders 51, respectively.

When the halfnuts 18 are driven in a direction to engage with the engaging grooves 14a, the movable platen 16 is fixed to the tie bars 14. When each halfnut 18 is driven in a direction which disengages from the engaging groove 14a, the movable platen 16 is free from the tie bars 14. When the movable platen 16 is free from the tie bars 14, the movable platen 16 is movable freely along the tie bars 14.

The control device 20 is electrically connected to the tie bar sliding servomotors 15 and the die opening/closing servomotors 17 via wiring lines 53, respectively. The control device 20 transmits control signals to the tie bar sliding servomotors 15 and the die opening/closing servomotors 17 via the wiring lines 53. Accordingly, the control device 20 controls the tie bar sliding servomotors 15 and the die opening/closing servomotors 17.

The control device 20 drives the tie bar sliding servomotors 15 to move the movable platen 16 backwards via the tie bars 14 during a core-back operation. Moreover, the control device 20 drives the die opening/closing servomotors 17 to apply, to the movable platen 16, a force directed to move the movable platen 16 forwards. The forward movement of the movable platen 16 indicates that the movable platen 16 moves in such a direction as to come close to the stationary platen 13.

Next, there will be described a die clamping method when using the die clamping unit 11.

First, the stationary die 25 and the movable die 42 are attached, and a die thickness adjusting operation is performed. Specifically, first the die opening/closing servomotors 17 are driven to move the movable platen 16 to a die closing limit. The die closing limit is a position immediately before the die face of the movable die 42 comes into contact with that of the stationary die 25.

Next, the halfnuts 18 are engaged with the engaging grooves 14a of the tie bars 14 by use of the opening/closing cylinders 51, respectively. This fixes the movable platen 16 to the tie bars 14. At this time, as shown in FIG. 2, clearances are formed before and after teeth between each halfnut 18 and each tie bar 14.

Figure 2:
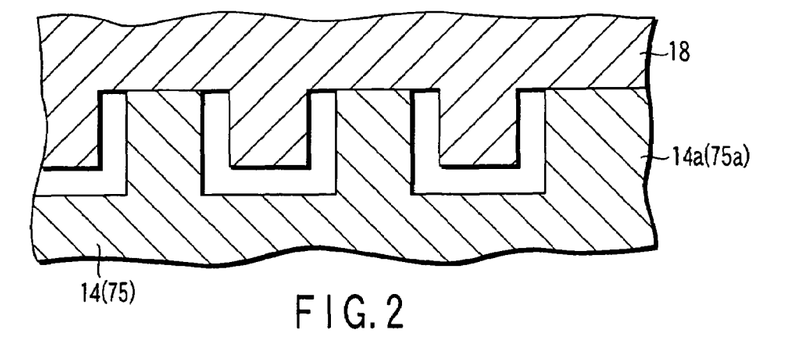
FIG. 2 is a sectional view showing an engaged state of a halfnut and a tie bar in an engagement operation, incorporated in the die clamping unit shown in FIG. 1.

Here, as shown in FIG. 2, the halfnut 18 may be appropriately engaged with the engaging groove 14a of the tie bar 14. However, the halfnut 18 is not appropriately engaged with the engaging groove 14a in some case owing to a deviation between ridges and grooves or the like. In this case, the tie bar sliding servomotors 15 are driven to finely move the tie bars 14 forwards. This adjusts a fixed position between the movable platen 16 and the tie bars 14, and the halfnuts 18 are appropriately engaged with the engaging grooves 14a, respectively.

At this time, a position of each tie bar 14 is read by a position sensor (not shown) disposed in the tie bar sliding servomotor 15, and the position is stored. In a subsequent die closing operation during molding, the driving of the tie bar sliding servomotor 15 is controlled in such a manner that the tie bar 14 is consistently moved to this stored position. A die thickness adjusting operation is completed in this manner. Therebefore or thereafter, a core-back amount is set to the control device 20. Specifically, a required core-back amount is calculated from a design and a material of a product, and this calculated value is input into the control device 20.

Thereafter, the process enters an injection molding cycle including the die closing operation and the core-back operation.

First, the die closing operation is performed. Specifically, the movable platen 16 is moved to the stored position by the die opening/closing servomotor 17. And, the tie bars 14 are moved to the stored position by the tie bar sliding servomotor 15. The halfnuts 18 are engaged with the engaging grooves 14*a* of the tie bars 14, and the movable platen 16 is fixed to the tie bars 14.

Figure 3:
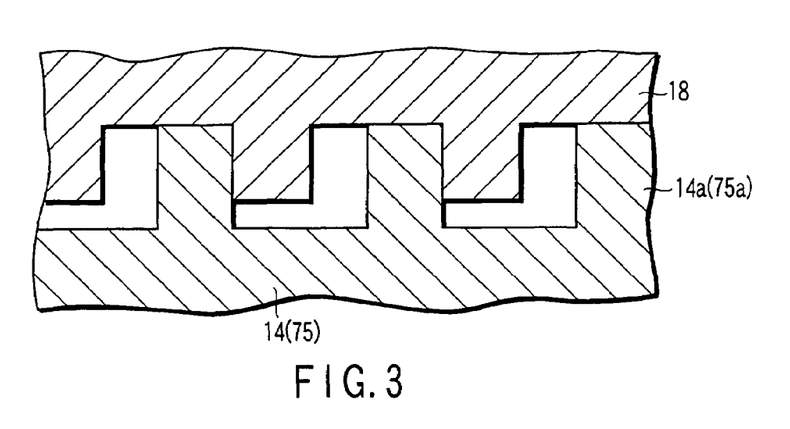
FIG. 3 is a sectional view showing an engaged state of the halfnut and the tie bar in a die clamping operation, according to the first embodiment.

After the die closing operation, the process enters an injection operation. In the injection operation, the hydraulic fluid is supplied to the die-clamping-side chambers 28 of the hydraulic die clamping cylinder 26, and the tie bars 14 are moved backwards. Moreover, as shown in FIG. 3, when each engaging groove 14*a* of the tie bar 14 comes into contact with a back face of a tooth of the halfnut 18, the movable platen 16 moves following the tie bars 14. Accordingly, the movable die 42 and the stationary die 25 are clamped. In a state in which the movable die 42 and the stationary die 25 are clamped, a material is injected from an injection nozzle, and the cavity 43 is filled with the material. An example of the material is a molten resin.

Here, in a case where a foaming agent is mixed with the material, the core-back operation is performed. In the core-back operation, the movable platen 16 is moved backwards in order to promote foaming of the foaming agent in the cavity 43.

The core-back operation is performed by driving the tie bar sliding servomotors 15 by the control device 20. The movable platen 16 is moved backwards at a low speed by the tie bar sliding servomotors 15 via the ball screws 33 and the tie bars 14, respectively.

Figure 4:
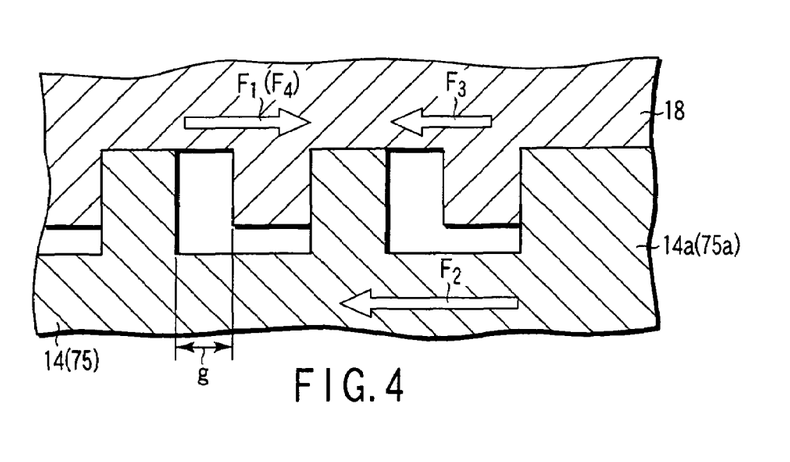
FIG. 4 is a sectional view showing an engaged state of the halfnut and the tie bar in a core-back operation, according to the first embodiment.

Specifically, the tie bar sliding servomotors 15 are first driven to move the tie bars 14 forwards. When each engaging groove 14*a* of the tie bar 14 comes in contact with a front face of the tooth of the halfnut 18 as shown in FIG. 4, the movable platen 16 moves following the tie bars 14.

At this time, gaps g are generated between the back faces of teeth of the halfnuts 18 and the engaging grooves 14*a* of the tie bars 14. That is, if the tie bar sliding servomotors 15 are stopped in this state, the movable platen 16 follows an inertial force, and moves excessively at least the wide of the gap g.

Therefore, the control device 20 drives the die opening/closing servomotors 17 in addition to the tie bar sliding servomotors 15. A driven direction of each die opening/closing servomotor 17 is a direction in which the movable platen 16 is moved forwards via the ball screws 48. Accordingly, a force $F_1$ which is in the direction toward the stationary platen 13 is applied to the movable platen 16. That is, the force $F_1$ is in a direction opposite to a moving direction of the movable platen 16.

A magnitude of this force $F_1$ is smaller than a magnitude of a force $F_2$ to be applied from the tie bar sliding servomotors 15 to the movable platen 16 in order to perform the core-back, and the magnitude has a value which is substantially greater than or equal to that of an inertial force $F_3$ of the movable platen 16. That is, the relationship $F_2 > F_1 \geq F_3$ is satisfied.

Specifically, a control instruction from the control device 20 to the die opening/closing servomotors 17 is given in accordance with a rotary speed S of each motor and a magnitude of a torque T. Here, the torque T needs to have a magnitude sufficient for generating the force $F_1$.

Various numerical values can be set to the rotary speed S of the motor. In the present embodiment, as an example zero rpm is set. That is, a control signal to retain the position of the movable platen 16 is supplied to each die opening/closing servomotor 17. However, this control signal is transmitted to the die opening/closing servomotor 17, and in actual the movable platen 16 moves backwards because $F_1 < F_2$.

Thereafter, a molded piece is molded through a pressure holding and cooling operation. Moreover, a die opening operation is performed, and the molded piece is removed, thereby completing one cycle of injection molding. The die opening operation is an operation in which the movable platen 16 is moved away from the stationary platen 13 by the die opening/closing servomotor 17 to remove the molded piece.

According to the die clamping unit 11 having such configuration, the servomotor which performs the core-back can be miniaturized. In an alternative embodiment, the present inventors also consider that, for example, a back pressure can be applied to the hydraulic die clamping cylinder 26 to cancel the inertial force of the movable platen 16, and the movable platen 16 can be inhibited from being moved in excess of a set amount of the core-back. Here, the inertial force of the movable platen 16 is not very large. Therefore, a value of the back pressure to be applied to the hydraulic die clamping cylinder 26 is also small.

However, the hydraulic die clamping cylinder 26 is originally a hydraulic cylinder which generates a die clamping force. Therefore, the hydraulic die clamping cylinder 26 has a large cylinder area. Therefore, in a case where the back pressure is applied to the hydraulic die clamping cylinder 26, even if the value of the pressure indicates a small magnitude, a large force can be generated as a whole.

On the other hand, each servomotor 15 which performs the core-back operation needs to overcome this large force and move the movable platen 16 backwards. Therefore, this servomotor 15, the ball screw 48 connected to the servomotor 15 or the like may require such a sufficiently large magnitude as to overcome the force of the hydraulic die clamping cylinder 26. As a result, a mechanism including the servomotors 15, the ball screws 48 and the like is enlarged.

On the other hand, in the die clamping unit 11 of the embodiment of the present invention, in the core-back operation, the force $F_1$ directed to the stationary platen 13 is applied to the movable platen 16 by use of the die opening/closing servomotors 17. This force $F_1$ cancels a force (i.e., the inertial force $F_3$) generated by inertia of the movable platen 16. Therefore, the movable platen 16 is inhibited from being moved in excess of the set value of the core-back by the own inertial force of the movable platen 16.

In the present embodiment, the die opening/closing servomotors 17 are driven to cancel the inertial force of the movable platen 16. Since this die opening/closing servomotor 17 originally moves the movable platen 16 against only a sliding resistance, an output of the servomotor is not large.

Therefore, in a case where the force $F_1$ to cancel the inertial force of the movable platen 16 is generated using each die opening/closing servomotor 17, the magnitude of the force $F_1$ can be set to a minimum magnitude required for canceling the inertial force $F_3$ of the movable platen 16. Since this force $F_1$ can be reduced, the core-back force $F_2$ to move the movable platen 16 backwards overcoming the canceling force can be reduced. Therefore, it is possible to miniaturize the tie bar sliding servomotors 15 which generate the force $F_2$, and the ball screws 33 connected to the servomotors. Accordingly, it is possible to obtain the die clamping unit capable of reducing costs.

Moreover, since the output of the die opening/closing servomotor 17 is not large, the value of the force $F_1$ can be finely set as compared with the hydraulic die clamping cylinder 26 is used. In other words, when the die opening/closing servomotors 17 are used, a resolution of the force to be applied to the movable platen 16 can be raised. When the value of the force $F_1$ is finely set, it is possible to improve precision in controlling the position of the movable platen 16 during the core-back. That is, it is possible to obtain the die clamping unit which improves precision of a core-back completing position of the movable platen 16.

Furthermore, since the output of the die opening/closing servomotor 17 can be finely set, fluctuations of the completion position of the movable platen 16 can be reduced every molding cycle.

It is noted that in the present embodiment, a value of a control signal of rotary speed to retain the position of the movable platen 16 to be supplied to the die opening/closing servomotor 17 during the core-back can be set to zero rpm. However, the control signal to be transmitted to the die opening/closing servomotor 17 is not limited to this signal. For example, a positive value, that is, a value to move the movable platen 16 forwards may be input into the die opening/closing servomotor 17, or a negative value, that is, a value to move the movable platen 16 backwards may be input into the servomotor. However, this control signal of the rotary speed S is transmitted to the die opening/closing servomotor 17. That is, since $F_1<F_2$, in actual the movable platen 16 moves backwards.

Next, there will be described a die clamping unit 61 in a second embodiment of the present invention with reference to FIGS. 5 and 2 to 4. It is to be noted that a constitution having the same function as that of the die clamping unit 11 of the first embodiment is denoted with the same reference numerals, and description thereof is omitted. The die clamping unit 61 of the present embodiment includes a core-back servomotor for exclusive use in a core-back operation instead of a tie bar sliding servomotor.

Figure 5:
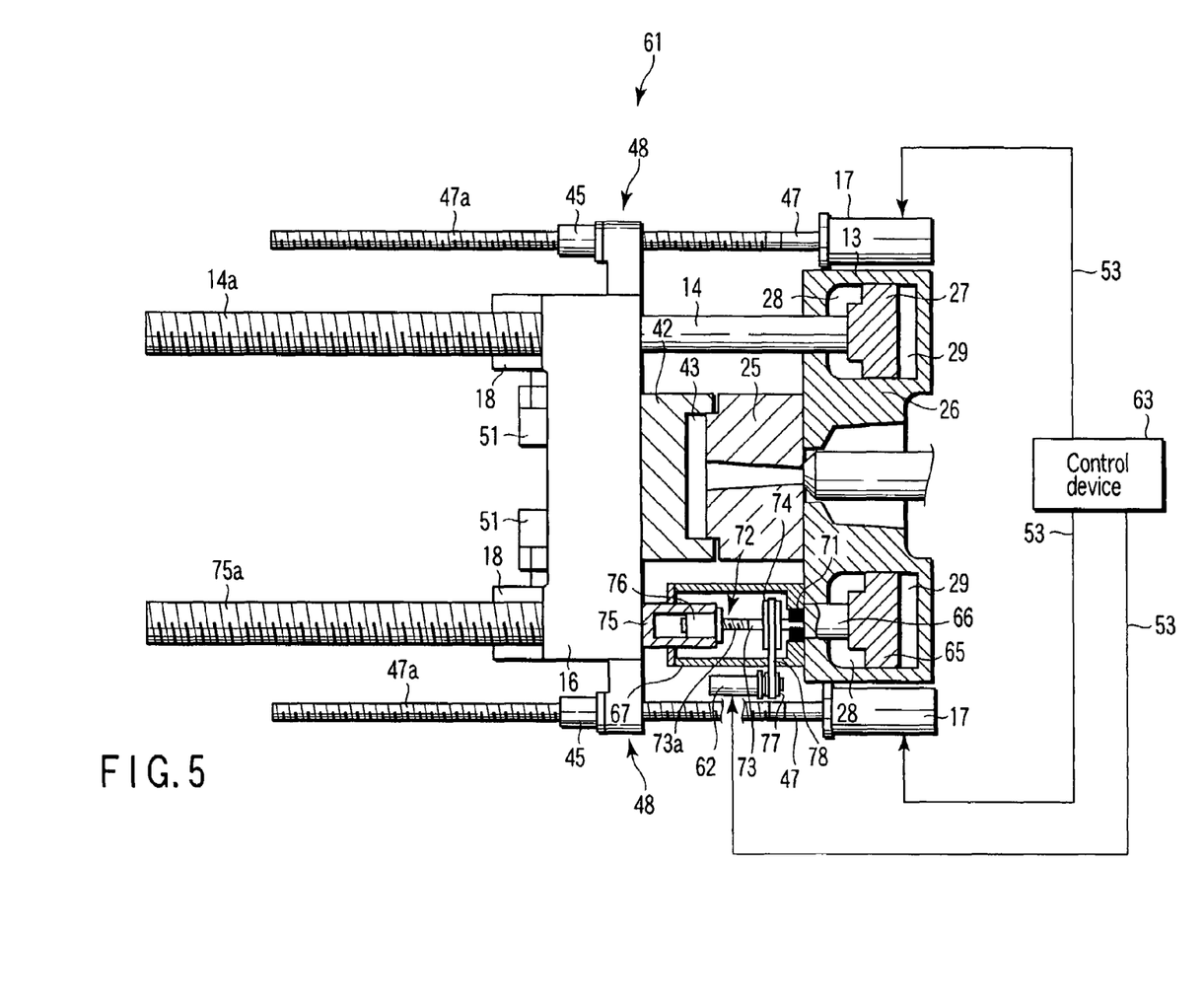
FIG. 5 is a plan view showing a section of a part of a die clamping unit, according to a second embodiment of the present invention.

As shown in FIG. 5, the die clamping unit 61 includes a stationary platen 13, a tie bar 75, a core-back servomotor 62 as a first servomotor, a movable platen 16, die opening/closing servomotors 17 as a second servomotor, halfnuts 18 as a fixing mechanism, and a control device 63.

A hydraulic die clamping cylinder 26 is provided in the stationary platen 13. A tie bar 14 is attached to the stationary platen 13 to be movable forwards and backwards. Specifically, a piston portion 27 of the tie bar 14 is disposed in the hydraulic die clamping cylinder 26.

Moreover, a piston 65 is provided in the hydraulic die clamping cylinder 26. A rod 66 is attached to the piston 65. A core-back box 67 is provided on a front face of the stationary platen 13. A bearing 71 is attached to a back face of the core-back box 67 coaxially with the piston 65. The back face of the core-back box 67 is a face attached to the stationary platen 13.

A threaded shaft 73 of a ball screw 72 is rotatably supported by the bearing 71. The ball screw 72 is one example of a feed screw. A proximal end of the threaded shaft 73 is rotatably fixed to the rod 66. A driven pulley 74 is attached to the threaded shaft 73.

The tie bar 75 is attached to the core-back box 67 in such a manner that the tie bar is movable forwards and backwards. Specifically, the proximal end of the tie bar 75 extends through the front face of the core-back box 67, and protrudes into the core-back box 67. A nut portion 76 is attached to the axial center of the proximal end of this tie bar 75. The nut portion 76 constitutes a part of the ball screw 72. A distal end of the threaded shaft 73 is provided with a screw portion 73a. This screw portion 73a is in threaded engagement with the nut portion 76.

The core-back servomotor 62 is disposed externally to the core-back box 67. The core-back servomotor 62 is provided with a driving pulley 77. A timing belt 78 is extended between the driving pulley 77 and the driven pulley 74.

Therefore, when the core-back servomotor 62 is driven, the threaded shaft 73 of the ball screw 72 rotates. A rotary movement of the threaded shaft 73 is transformed into a linear movement of the tie bar 75 via the nut portion 76. That is, the core-back servomotor 62 can be driven to move the tie bar 75 forwards and backwards.

The movable platen 16 is attached via the tie bar 14 and the tie bar 75. The movable platen 16 is movable along the tie bar 14 and the tie bar 75 in such a direction so as to come close to or move away from the stationary platen 13. Outer peripheral faces of the tie bar 14 and the tie bar 75 are provided with engaging grooves 14a, 75a each including a saw-tooth, threaded or annular groove.

The halfnuts 18 are provided on the back face of the movable platen 16. The halfnut 18 releasably engages with the engaging groove 14a of the tie bar 14 or the engaging groove 75a of the tie bar 75. The halfnuts 18 are driven in a radial direction by opening/closing cylinders 51, respectively.

When the halfnuts 18 are driven in directions to engage with the engaging grooves 14a, 75a, the movable platen 16 is fixed to the tie bar 14 and the tie bar 75. When the halfnuts 18 are driven in directions to disengage from the engaging grooves 14a, 75a, the movable platen 16 is free from the tie bars 14, 75. When the movable platen 16 is free from the tie bars 14, 75, the movable platen 16 is freely movable along the tie bars 14, 75.

The control device 63 is connected to the core-back servomotor 62 and the die opening/closing servomotors 17 via wiring lines 53, respectively. The control device 63 transmits control signals to the core-back servomotor 62 and the die opening/closing servomotors 17 via the wiring lines 53. Accordingly, the control device 63 controls the core-back servomotor 62 and the die opening/closing servomotors 17.

The control device 63 drives the core-back servomotor 62 to move the movable platen 16 backwards via the tie bar 75 in the core-back operation. Moreover, the control device 63 drives the die opening/closing servomotors 17 to apply, to the movable platen 16, a force directed to move the movable platen 16 forwards.

Next, there will be described a die clamping method by use of the die clamping unit 61.

Here, since a die thickness adjusting operation, a die closing operation, an injection operation, a pressure holding and cooling operation, and a die opening operation are substantially similar to those of the first embodiment, description thereof is omitted.

The control device 63 drives the core-back servomotor 62 to thereby perform the core-back operation. The core-back servomotor 62 moves the movable platen 16 backwards at a low speed via the ball screw 72 and the tie bar 75.

Moreover, the control device 63 drives the die opening/closing servomotors 17 in addition to the core-back servomotor 62. A driving direction of each die opening/closing servomotor 17 is a direction in which the movable platen 16 is moved forwards via ball screws 48. Accordingly, the movable platen 16 is subject to a force $F_1$ which is in the direction toward the stationary platen 13. That is, the force $F_1$ is in a direction opposite to a moving direction of the movable platen 16.

A magnitude of this force $F_1$ is smaller than the magnitude of a force $F_2$ to be applied from the core-back servomotor 62 to the movable platen 16 in order to perform the core-back, and the magnitude of force $F_1$ is substantially greater than a magnitude of an inertial force $F_3$ of the movable platen 16. That is, the relationship $F_4 > F_1 \geqq F_3$ is satisfied. It is to be noted that a specific control instruction from the control device 63 to the die opening/closing servomotor 17 is the same as that of the first embodiment.

According to the die clamping unit 61 including such configuration, the force $F_1$ directed toward the stationary platen 13 is applied to the movable platen 16 by use of the die opening/closing servomotors 17 in the core-back operation. This force $F_1$ cancels a force (i.e., an inertial force $F_3$) generated by inertia of the movable platen 16. Therefore, the movable platen 16 is inhibited from being moved in excess of the set value of the core-back by the own inertial force of the movable platen 16.

Moreover, for a reason similar to that of the first embodiment, an output of the die opening/closing servomotor 17 is not large. That is, the magnitude of the force $F_1$ can be set to a minimum magnitude required for canceling the inertial force of the movable platen 16. That is, it is possible to reduce the force $F_4$ for performing the core-back of the movable platen 16 against the force $F_1$. Therefore, it is possible to miniaturize the core-back servomotor 62 which generates the force $F_4$, and the ball screw 72 connected to the servomotor 62.

Also, with respect to controlling the positioning of the movable platen in the core-back operation, for a reason similar to that of the first embodiment, it is possible to obtain a die clamping unit in which precision of a core-back completion position is improved and in which fluctuations in each molding cycle can be reduced.

Next, there will be described a die clamping unit 81 in a third embodiment of the present invention with reference to FIGS. 6 to 9. It is to be noted that a constitution having the same function as that of the die clamping unit 11 of the first embodiment is denoted with the same reference numerals, and description thereof is omitted. The die clamping unit 81 of the present embodiment includes a ram sliding servomotor which moves a die clamping ram forwards and backwards instead of a tie bar sliding servomotor.

Figure 6:
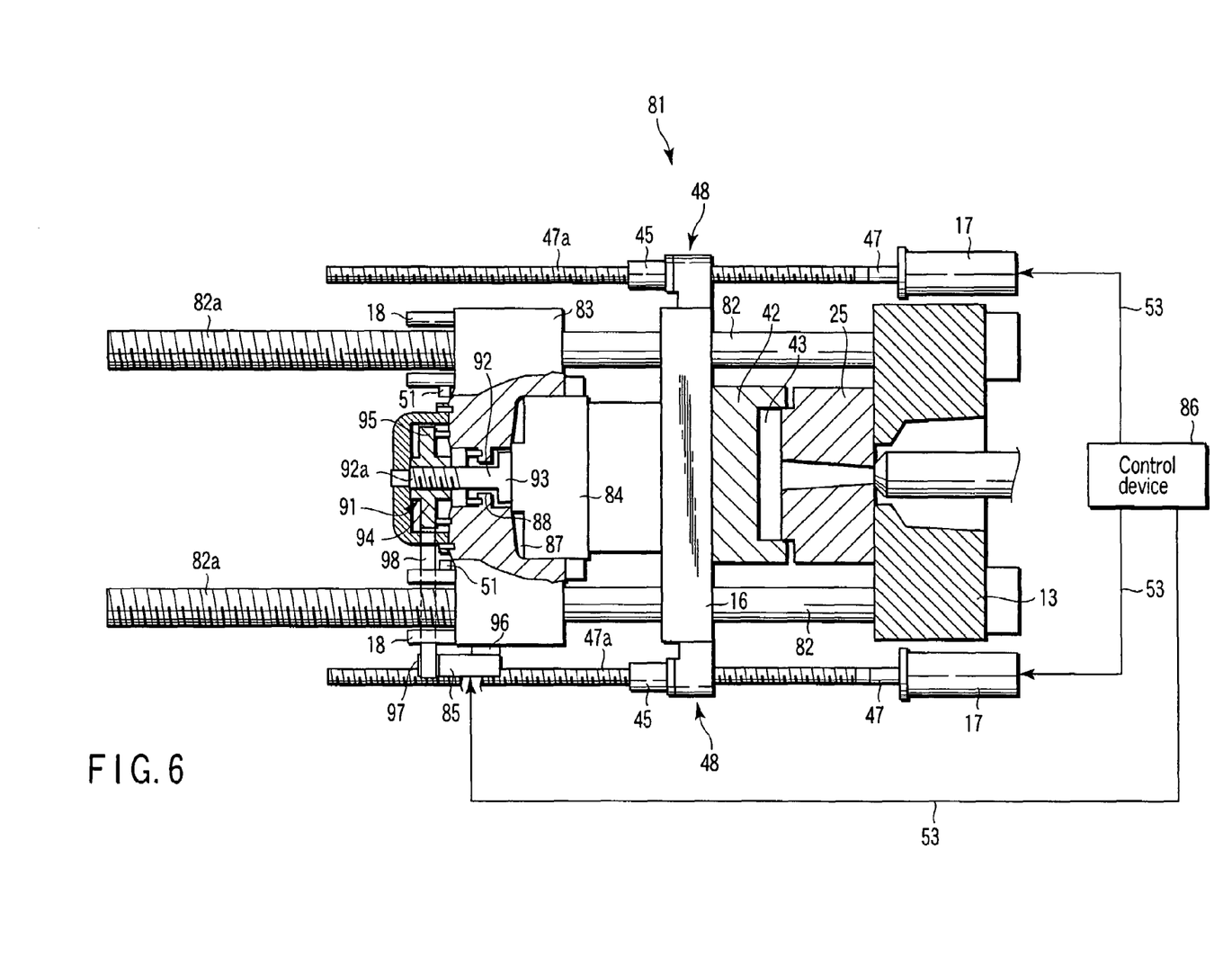
FIG. 6 is a plan view showing a section of a part of a die clamping unit, according to a third embodiment of the present invention.

As shown in FIG. 6, the die clamping unit 81 includes a stationary platen 13, tie bars 82, a movable platen 16, a hydraulic die clamping cylinder 83, a die clamping ram 84, a ram sliding servomotor 85 as a first servomotor, die opening/closing servomotors 17 as a second servomotor, halfnuts 18 as a fixing mechanism, and a control device 86.

A plurality of tie bars 82 are fixed to the stationary platen 13. The hydraulic die clamping cylinder 83 is provided on a side opposite to the stationary platen 13, the movable platen 16 being sandwiched between the cylinder 83 and the platen 13. The hydraulic die clamping cylinder 83 is movable forwards and backwards with respect to the stationary platen 3. The hydraulic die clamping cylinder 83 has a hydraulic chamber 87 which opens in a front face, that is, a face of the cylinder opposite to the movable platen 16. The die clamping ram 84 is attached to the hydraulic chamber 87 to be movable forwards and backwards with respect to the stationary platen 13.

A distal end of the die clamping ram 84 is connected to the movable platen 16. That is, when the die clamping ram 84 moves forwards and backwards, the movable platen 16 moves forwards and backwards following the die clamping ram 84.

A stepped through hole 88 is provided in series to the hydraulic chamber 87 in a back face of the hydraulic die clamping cylinder 83. A threaded shaft 92 of a ball screw 91 is inserted into the stepped through hole 88 in such a manner that the ball screw 91 is movable forwards and backwards. The ball screw 91 is one example of a feed screw.

A distal end of the ball screw 91 is provided with a flange portion 93. The flange portion 93 is connected to the die clamping ram 84. A proximal end of the ball screw 91 protrudes rearwards from the hydraulic die clamping cylinder 83, that is, to the left in FIG. 6. A screw portion 92a is formed on a protruding portion of the ball screw 91.

A nut portion 94 is in threaded engagement with the screw portion 92a. The nut portion 94 is a part of the ball screw 91. A driven pulley 95 is attached to the nut portion 94.

The ram sliding servomotor 85 is attached to the hydraulic die clamping cylinder 83 by a bracket 96. The ram sliding servomotor 85 is provided with a driving pulley 97. A timing belt 98 is extended between the driving pulley 97 and the driven pulley 95.

Therefore, the ram sliding servomotor 85 is driven to thereby rotate the nut portion 94 of the ball screw 91. This rotation of the nut portion 94 is transformed into a linear movement of the threaded shaft 92 by the ball screw 91. According to this linear movement, the die clamping ram 84 fixed to the ball screw 91 moves forwards and backwards in an axial direction.

The halfnuts 18 are provided on the back face of the hydraulic die clamping cylinder 83. The halfnuts 18 releasably engage with engaging grooves 82a of the tie bars 82. The halfnuts 18 are driven in a radial direction by an opening/closing cylinders 51, respectively.

When the halfnuts 18 are driven in directions to engage with the engaging grooves 82a, the hydraulic die clamping cylinder 83 is fixed to the tie bars 82. In a case where each halfnut 18 is driven in a direction in which the halfnut disengages from the engaging groove 82a, the hydraulic die clamping cylinder 83 is free from the tie bars 82. When the hydraulic die clamping cylinder 83 is free from the tie bars 82, the movable platen 16 is movable freely along the tie bars 82.

The control device 86 is connected to the ram sliding servomotor 85 and the die opening/closing servomotors 17 via wiring lines 53, respectively. The control device 86 transmits control signals to the ram sliding servomotor 85 and the die opening/closing servomotors 17 via the wiring lines 53. Accordingly, the control device 86 controls the ram sliding servomotor 85 and the die opening/closing servomotors 17.

The control device 86 drives the ram sliding servomotor 85 to move the movable platen 16 backwards via the die clamping ram 84 in a core-back operation. Moreover, the control device 86 drives the die opening/closing servomotors 17 to apply, to the movable platen 16, a force directed to move the movable platen 16 forwards.

Next, there will be described a die clamping method using the die clamping unit 81.

Since a die closing operation, a pressure holding and cooling operation, and a die opening operation are substantially similar to those of the first embodiment in an injection molding process, description thereof is omitted.

First, a stationary die 25 and a movable die 42 are attached, and a die thickness adjusting operation is performed. Specifically, first the die opening/closing servomotors 17 are driven to move the movable platen 16 to a die closing limit. Here, the hydraulic die clamping cylinder 83 is connected to the movable platen 16 via the die clamping ram 84. Therefore, the hydraulic die clamping cylinder 83 also moves following the movable platen 16.

Figure 7:
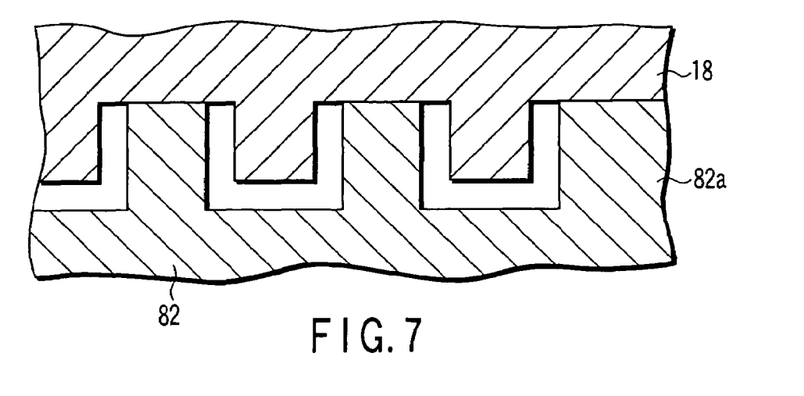
FIG. 7 is a sectional view showing an engaged state of a halfnut and a tie bar in an engagement operation incorporated in the die clamping unit shown in FIG. 6.

Next, the halfnuts 18 are engaged with the engaging grooves 82a of the tie bars 82 by use of the opening/closing cylinders 51, respectively. This operation fixes the hydraulic die clamping cylinder 83 to the tie bars 82. At this time, as shown in FIG. 7, clearances are formed before and after teeth between each halfnut 18 and each tie bar 82.

Here, when the halfnut 18 does not appropriately engage with the engaging groove 82a of the tie bar 82, the ram sliding servomotor 85 is driven to perform adjustment. Specifically, the ram sliding servomotor 85 is driven to apply, to the die clamping ram 84, a force to move the movable platen 16 forwards via the nut portion 94. However, since the movable platen 16 is in the mold closing limit, the movable platen 16 cannot move forwards.

As a result, the hydraulic die clamping cylinder 83 moves backwards by a reactive force received from the die clamping ram 84. The backward movement of the hydraulic die clamping cylinder 83 indicates that the cylinder moves in a direction in which the cylinder moves away from the stationary platen 13. Accordingly, fixed positions of the hydraulic die clamping cylinder 83 and the tie bars 82 are adjusted, and the halfnuts 18 are appropriately engaged with the engaging grooves 82$a$. Moreover, positions of the tie bars 82 are read by a position sensor (not shown) disposed in the ram sliding servomotor 85, and the positions are stored.

Thereafter, the process enters an injection molding cycle including a die closing operation and the core-back operation.

First, the die closing operation is performed. Specifically, the movable platen 16 is moved to the stored position by the die opening/closing servomotor 17. And the tie bars 82 are moved to the stored position by the ram sliding servomotor 85. The halfnuts 18 are engaged with the engaging grooves 82$a$ of the tie bars 82, and the hydraulic die clamping cylinder 83 is fixed to the tie bars 82.

After the die closing operation, the process enters an injection operation. In the injection operation, a hydraulic fluid is supplied to the hydraulic chamber 87 of the hydraulic die clamping cylinder 83, and the movable platen 16 is moved forwards via the die clamping ram 84. Here, when the movable die 42 comes into contact with the stationary die 25, the movable platen 16 cannot move forwards any more. When the hydraulic fluid continues to be supplied to the hydraulic chamber 87 in this state, first the hydraulic die clamping cylinder 83 moves backwards by a reactive force.

Figure 8:
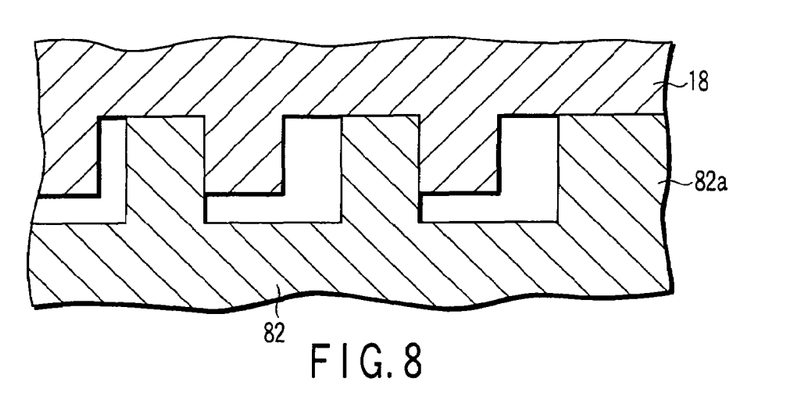
FIG. 8 is a sectional view showing an engaged state of the halfnut and the tie bar in a die clamping operation, according to the third embodiment.

Moreover, when a back face of a tooth of the halfnut 18 comes into contact with the engaging groove 82$a$ of the tie bar 82 as shown in FIG. 8, the hydraulic die clamping cylinder 83 cannot move backwards any more. When the hydraulic fluid further continues to be supplied to the hydraulic chamber 87 in this state, the movable die 42 and the stationary die 25 are clamped. In a state in which the movable die 42 and the stationary die 25 are clamped, a material is injected from an injection nozzle, and a cavity 43 is filled with the material. An example of the material is a molten resin.

Here, in a case where a foaming agent is mixed in the material, the core-back operation is performed to move the movable platen 16 backwards in order to promote foaming of the foaming agent in the cavity 43.

The core-back operation is performed by driving the ram sliding servomotor 85 by the control device 86. The movable platen 16 is moved backwards at a low speed by the ram sliding servomotor 85 via the ball screw 91 and the die clamping ram 84, respectively.

At this time, a molded piece is disposed between the movable die 42 and the stationary die 25. Therefore, when the movable platen 16 is to be moved backwards, a frictional force is generated between the molded piece sticking to the movable die 42 and the stationary die 25. Therefore, when the ram sliding servomotor 85 is driven, first the hydraulic die clamping cylinder 83 moves forwards on which no external force acts.

Figure 9:
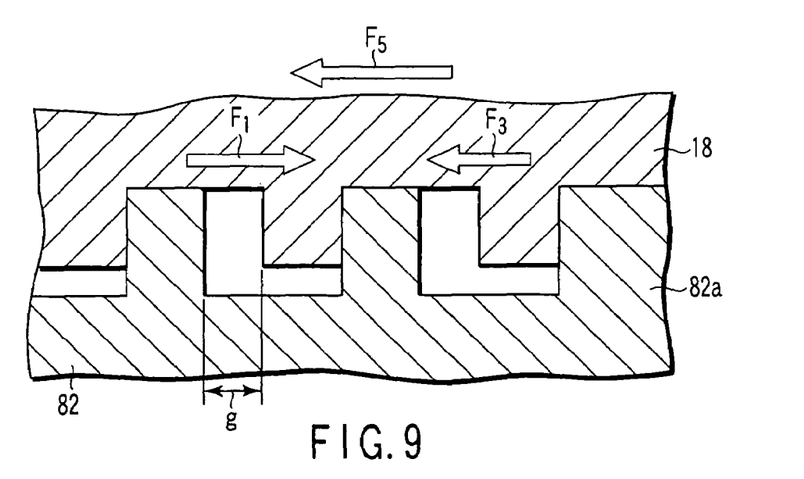
FIG. 9 is a sectional view showing an engaged state of the halfnut and the tie bar in a core-back operation, according to the third embodiment.

Moreover, the hydraulic die clamping cylinder 83 moves forwards. When a front face of a tooth of the halfnut 18 comes into contact with the engaging groove 82$a$ of the tie bar 82 as shown in FIG. 9, the hydraulic die clamping cylinder 83 cannot move forwards any more. Thereafter, when the ram sliding servomotor 85 is further driven, the movable platen 16 overcomes the frictional force to move backwards.

As shown in FIG. 9, at this time, gaps g are generated between the halfnut 18 and the engaging groove 82$a$ of the tie bar 82. That is, if the ram sliding servomotor 85 is stopped in this state, the movable platen 16 can move excessively in the wide of gap g in accordance with an inertial force.

According to the die clamping unit 81 the control device 86 drives the ram sliding servomotor 85, and further drives the die opening/closing servomotors 17. A driven direction of the die opening/closing servomotor 17 is a direction in which the movable platen 16 is moved forwards via the ball screw 48. Accordingly, a force $F_1$ which is in a direction toward the stationary platen 13 is applied to the movable platen 16. That is the force $F_1$ is in a direction opposite to a moving direction, of the movable platen 16.

A magnitude of this force $F_1$ is smaller than that of a force $F_5$ to be applied from the ram sliding servomotor 85 to the movable platen 16 in order to perform the core-back, and the magnitude of force $F_1$ has a value which is substantially greater than or equal to that of an inertial force $F_3$ of the movable platen 16. That is, the relationship $F_5 > F_1 \geq F_3$ is satisfied. A specific control instruction from the control device 86 to the die opening/closing servomotor 17 is the same as that of the first embodiment.

According to the die clamping unit 81 including such configuration, the force $F_1$ directed to the stationary platen 13 is applied to the movable platen 16 with the use of the die opening/closing servomotors 17 in the core-back operation. This force $F_1$ cancels a force (i.e., an inertial force F3) generated by inertia of the movable platen 16. Therefore, the movable platen 16 is inhibited from being moved in excess of the set value of the core-back by the inertial force of the movable platen 16.

Moreover, for a reason similar to that of the first embodiment, an output of the die opening/closing servomotor 17 may not be large. That is, the magnitude of the force $F_1$ can be set to a minimum magnitude required for canceling the inertial force $F_3$ of the movable platen 16. That is, it is possible to reduce the force $F_5$ for performing the core-back of the movable platen 16 against the force $F_1$. Therefore, it is possible to miniaturize the ram sliding servomotor 85 which generates the force $F_5$, and the ball screw 91 connected to the servomotor 85.

Also, with respect to controlling the position of the movable platen 16 in the core-back operation, for a reason similar to that of the first embodiment, it is possible to obtain a die clamping unit in which precision of a core-back completion position is improved and in which fluctuations in each molding cycle can be reduced.

In the first to third embodiments, a pulley and a belt are used for power transmission between the tie bar sliding servomotor, the core-back servomotor, or the ram sliding servomotor and the ball screw. However, a power may be transmitted using for example, a gear. The screw is not limited to the ball screw, and a feed screw mechanism may be used such as a threaded or planetary roller screw as long as the rotary movement can be transformed into linear movement.

It is to be noted that the present invention is not limited to the above embodiments as such, and constituent elements may be modified to embody the invention without departing from the scope of the invention, in an implementation stage. A plurality of constituent elements disclosed in the above embodiments may be appropriately combined to provide additional embodiments of the invention. For example, several constituent elements may be omitted in the embodiments.

Furthermore, the constituent elements of different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A die clamping unit comprising:
   a stationary platen;
   a tie bar attached to the stationary platen;
   a movable platen configured to be movable forwards and backwards along the tie bar with respect to the stationary platen;
   a first servomotor configured to move the movable platen away from the stationary platen in a core-back operation;
   a second servomotor configured to move the movable platen forwards and backwards to open or close a die; and
   a control device configured to drive the first servomotor to move the movable platen away from the stationary platen and to drive the second servomotor to apply a force to the movable platen in a direction toward the stationary platen in the core-back operation.

2. The die clamping unit according to claim 1, further comprising:
   a fixing mechanism configured to detachably fix the movable platen to the tie bar,
   wherein the tie bar is attached to the stationary platen to be movable forwards and backwards,
   wherein the first servomotor is configured to move the tie bar forwards and backwards, and
   wherein the control device is configured to fix the movable platen to the tie bar by the fixing mechanism and to drive the first servomotor to move the tie bar so as to move the movable platen away from the stationary platen in the core-back operation.

3. The die clamping unit according to claim 2, further comprising:
   a feed screw including a nut portion fixed to the movable platen and a threaded shaft brought into threaded engagement with the nut portion,
   wherein the second servomotor is configured to rotate the threaded shaft to move the movable platen forwards and backwards.

4. The die clamping unit according to claim 3, wherein the first servomotor and the second servomotor are constructed and arranged such that the force applied by the second servomotor to the movable platen in the core-back operation is equal to or larger than an inertial force of the movable platen, and the force applied by the second servomotor is smaller than a force applied by the first servomotor to the movable platen.

5. The die clamping unit according to claim 1, further comprising:
   a hydraulic die clamping cylinder which is provided on a side of the movable platen opposite to the stationary platen, the cylinder being movable forwards and backwards with respect to the stationary platen;
   a die clamping ram attached to the hydraulic die clamping cylinder to be movable forwards and backwards and connected to the movable platen; and
   a fixing mechanism configured to detachably fix the hydraulic die clamping cylinder to the tie bar,
   wherein the first servomotor is configured to move the die clamping ram forwards and backwards, and
   wherein the control device is configured to fix the hydraulic die clamping cylinder to the tie bar by the fixing mechanism and to drive the first servomotor to move the ram so as to move the movable platen away from the stationary platen in the core-back operation.

6. The die clamping unit according to claim 5, further comprising:
   a feed screw including a nut portion fixed to the movable platen and a threaded shaft brought into threaded engagement with the nut portion,
   wherein the second servomotor is configured to rotate the threaded shaft to move the movable platen forwards and backwards.

7. The die clamping unit according to claim 6, wherein the first servomotor and the second servomotor are constructed and arranged such that the force applied by the second servomotor to the movable platen in the core-back operation is equal to or larger than an inertial force of the movable platen, and the force applied by the second servomotor is smaller than a force applied by the first servomotor to the movable platen.

8. The die clamping unit according to claim 1, wherein the first servomotor is constructed and arranged to adjust fixed positions of the moveable platen and the tie bar during die-closing.

* * * * *